US005371647A

United States Patent [19]

Fried et al.

[11] Patent Number: 5,371,647

[45] Date of Patent: Dec. 6, 1994

[54] SURGE PROTECTION CIRCUIT MODULE AND METHOD FOR ASSEMBLING SAME

[75] Inventors: Robert L. Fried, Plainview; Lou Schilling, Uniondale, both of N.Y.; Willem Einthoven, Belle Mead, N.J.; Muni Mitchell, Holbrook, N.Y.

[73] Assignee: General Instrument Corporation, Hatboro, Pa.

[21] Appl. No.: 917,778

[22] Filed: Jul. 21, 1992

[51] Int. Cl.[5] ............ H02H 3/22

[52] U.S. Cl. ............ 361/119; 361/111

[58] Field of Search ............ 361/119, 111, 91; 257/705, 725, 909

[56] References Cited

U.S. PATENT DOCUMENTS

| | | | |
|---|---|---|---|
| 4,218,694 | 8/1980 | Grzybowski | 257/705 |
| 4,408,248 | 10/1983 | Bulley | 361/91 |
| 4,796,150 | 1/1989 | Dickey | 361/119 |
| 5,150,271 | 9/1992 | Unterweger et al. | 361/119 |

*Primary Examiner*—A. D. Pellinen
*Assistant Examiner*—Sally C. Medley
*Attorney, Agent, or Firm*—Marshall, O'Toole, Gerstein, Murray & Borun

[57] ABSTRACT

Sets of six steering diodes and an ungated Thyristor are simultaneously formed into surge protection circuit modules by mass production techniques. An extended lead frame is provided with three spaced parallel leads for each module. The leads are connected at one end by a bridge. The sets of components are arranged along the lead frame in a fixture. By heating, each lead is soldered between a pair of steering diodes and the steering diodes on each side of the lead frame are soldered to different conductive plates. A thyristor is soldered between the plates. The partially formed modules are removed as a unit from the fixture and may be encased simultaneously. The bridge is removed to separate the modules and the leads trimmed and bent as required.

28 Claims, 5 Drawing Sheets

SURGE PROTECTION CIRCUIT MODULE AND METHOD FOR ASSEMBLING SAME

The present invention relates to surge protection circuits designed for use in devices which protect telecommunications equipment from power surges and more particularly to a surge protection circuit which can be fabricated as a module and employs a unique lead frame which permits the use of mass production techniques to fabricate the modules in batches.

U.S. Pat. No. 4,796,150 issued Jan. 3, 1989 to Dickey et al. discloses a mechanical-electrical device for protecting telecommunications equipment from power surges which may occur on the tip and/or ring conductors of attached transmission lines. The device disclosed by Dickey and similar devices of this type employ a solid state surge protection circuit.

The Dickey circuit provides protection against surges in both tip and ring conductors by utilizing certain mechanical components plus seven discrete semiconductor devices. Six of the semiconductor devices are diodes which function as rectifiers, permitting the passage of current in only one direction. They are referred to as "steering" diodes for that reason. The seventh device is a self-triggering (ungated) Thyristor surge suppression device (or Shockley diode) fabricated on a single chip.

The Dickey device includes a non-conductive housing with several mechanical parts. Openings are formed in the housing to receive the discrete semiconductors, and the metallic plates associated with the semiconductors which act as electrical connectors and heat dissipaters. The housing has a complex structure and the semiconductors and plates must be mounted manually, one at a time. This adds greatly to the assembly time and overall cost of the protection device.

The present invention overcomes these problems by providing a unitary circuit module adapted to be installed as a single unit in a telecommunications protection device of the type described by Dickey which employs a unique lead frame permitting the modules to be fabricated using mass production techniques. As a result, the cost of the circuit itself is reduced, as is the cost of the construction and assembly of the protection device.

It is, therefore, a prime object of the present invention to provide a unitary solid state protection circuit module for use in telecommunications equipment protection devices.

It is another object of the present invention to provide a protection circuit module which can be produced by mass production techniques.

It is another object of the present invention to provide a lead frame for a protection circuit module which functions as a base to permit multiple modules to be soldered simultaneously.

It is another object of the present invention to provide a method for fabricating a protection circuit module which employs soldered construction to insure excellent electrical and thermal conductance.

It is another object of the present invention to provide a protection circuit module which may employ prepassivated diodes.

It is another object of the present invention to provide a protection circuit module which may employ a preassembled Thyristor cell which can be surge tested prior to final assembly.

In accordance with one aspect of the present invention, a circuit module is provided of the type used to protect telecommunications equipment from power surges by connecting one or both of the tip and ring conductors to a ground conductor. The module comprises lead means including first, second and third substantially parallel spaced leads. First, second and third steering diodes are operably connected to a first conductive plate. Fourth, fifth and sixth steering diodes are operably connected to a second conductive plate, in substantial alignment with the first, second and third diodes, respectively, to form aligned sets of steering diodes. Each lead is operably connected between a different set of aligned steering diodes. A thyristor is operably connected between the plates. Means are provided for encasing the plates and devices, with a portion of each lead exposed. The exposed portions of the leads are connected to the tip, ring, and ground conductors. The steering diodes function as a rectifier. They preferably comprise passivated rectifier chips or preassembled rectifier cells.

Preferably, the encasing means is an encapsulating material such as epoxy. Alternately, the plates and devices can be enclosed in a snap-on plastic package.

Preferably, the diodes are soldered to the plates to make the best electrical and thermal connection. The diodes are soldered to the leads, as well.

In accordance with another aspect of the present invention, a method is provided for fabricating a plurality of circuit modules for use in protecting telecommunications equipment from power surges. The method comprises forming a lead frame consisting of first, second and third conductive leads for each module to be formed and a means for retaining the leads in spaced, parallel relation. First and second sets of three steering diodes are formed for each module. First and second conductive plates are formed for each module. One of the steering diode sets is connected to each plate. An ungated thyristor is connected between the plates. The lead frame is connected between the diode sets. Each of the steering diodes in one of the sets aligns with the corresponding diode in the other set to form three pairs for each module. Each lead is connected between the diodes of a different pair. The plates and devices are encased. A portion of the leads remains exposed. Thereafter, the retaining means is removed to form modules with individual, electrically isolated leads.

The assembly is encased by encapsulating all of the modules along the lead frame simultaneously. This can be accomplished by encasing a nonconductive material such as epoxy prior to removing the retaining means. Otherwise, the modules can be separated and then enclosed in snap-on plastic packages.

The components are placed in a solder fixture. The leads are soldered between the diodes pairs by heating.

The diodes are soldered to the plates. The lead frame is soldered between the diodes in each aligned steering diode pair. The exposed ends of leads may be bent, as required.

To these and such other objects which may hereafter appear, the present invention relates to a surge protection circuit module and a method for fabricating same, as described in the following specification and recited in the annexed claims, taken together with the accompanying drawings, wherein like numerals refer to like parts and in which:

Figure 1:
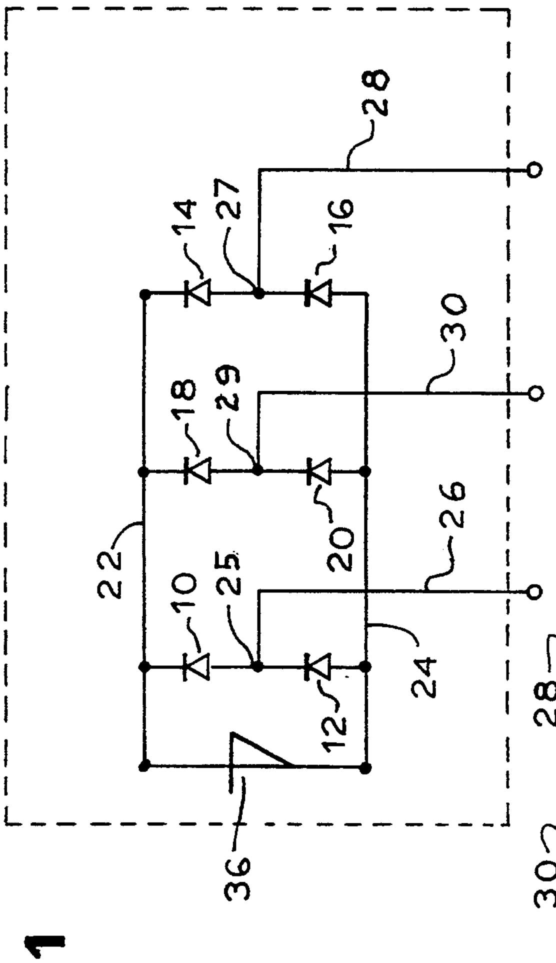
FIG. 1 is a schematic drawing of the circuit of the present invention.
Figure 2:
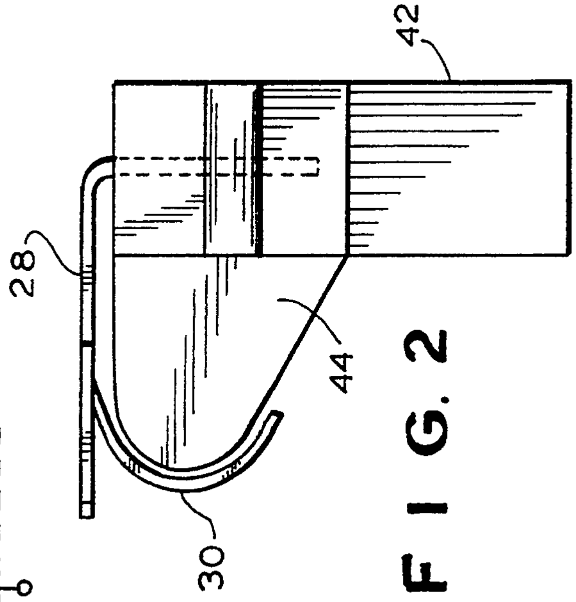
FIG. 2 is a side elevational view of a first preferred embodiment of the circuit module of the present invention.
Figure 3:
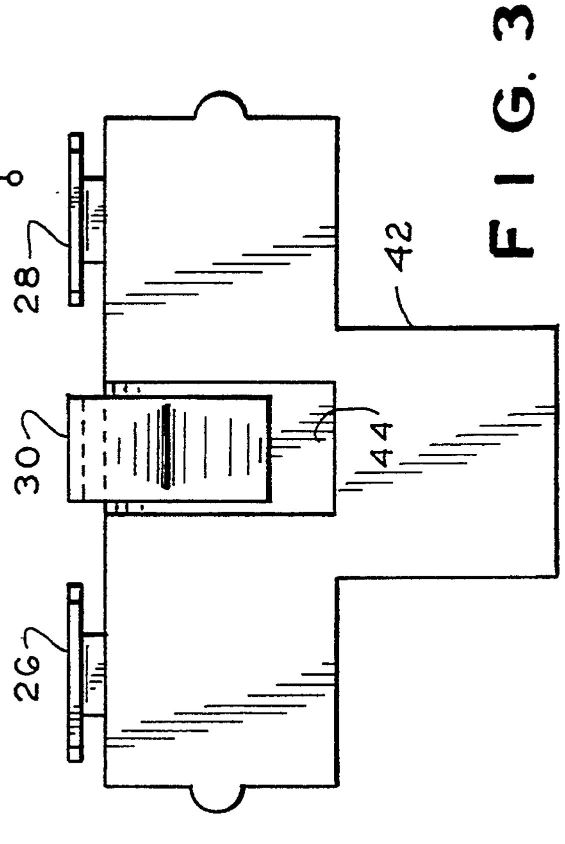
FIG. 3 is a front view of the first preferred embodiment.
Figure 6:
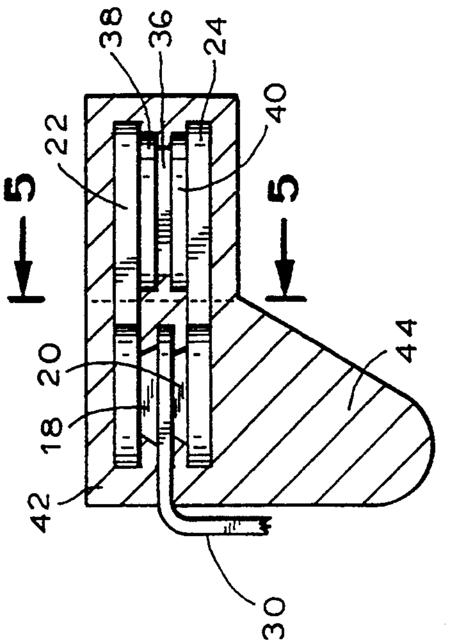
FIG. 6 is a side cross-sectional view of the first preferred embodiment taken along line 6—6 of FIG. 5.
Figure 4:
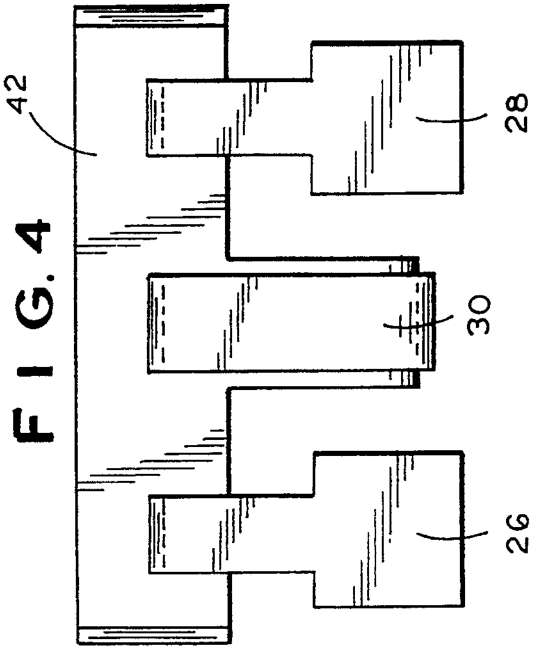
FIG. 4 is a top elevational view of the first preferred embodiment.
Figure 5:
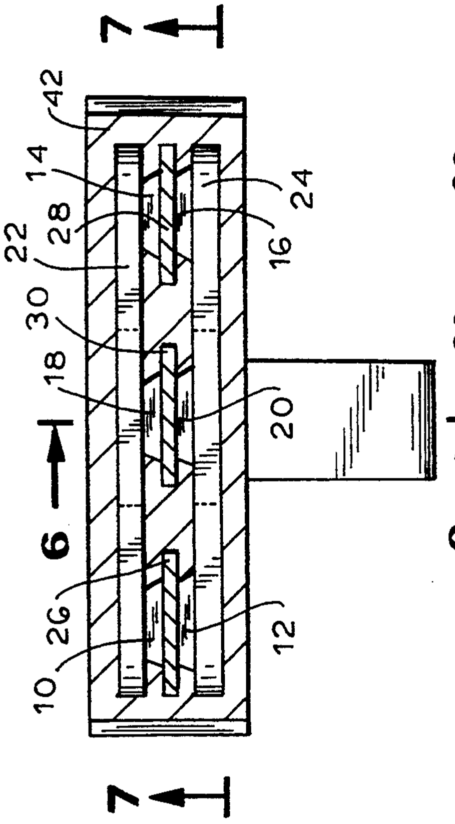
FIG. 5 is a top cross-sectional view of the first preferred embodiment taken along line 5—5 of FIG. 6.
Figure 7:
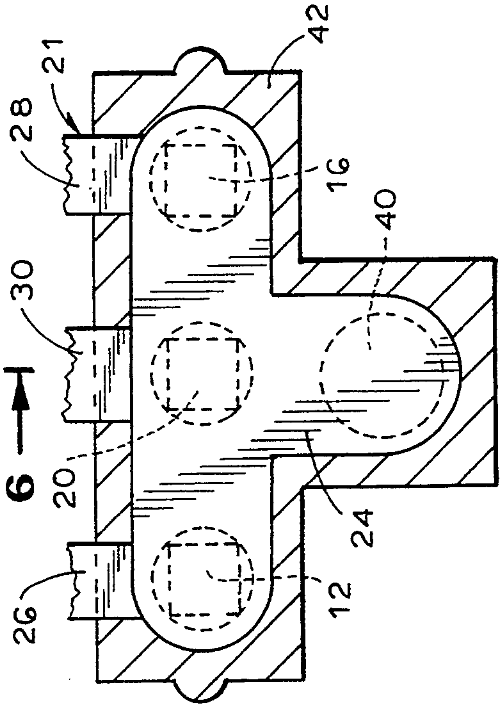
FIG. 7 is a front cross-sectional view of the first preferred embodiment taken along line 7—7 of FIG. 5.
Figure 14:
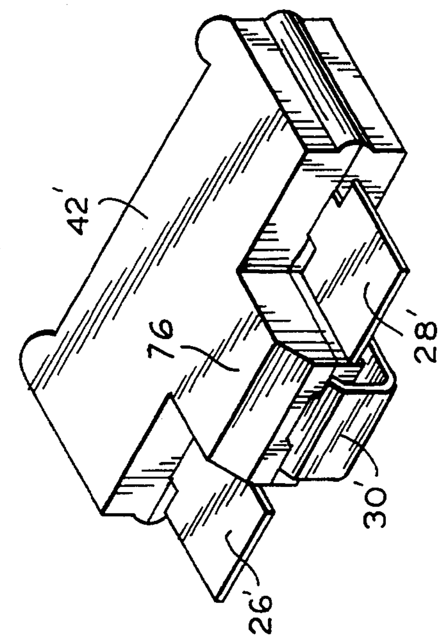
FIG. 14 is an isometric view of the second preferred embodiment.
Figure 9:
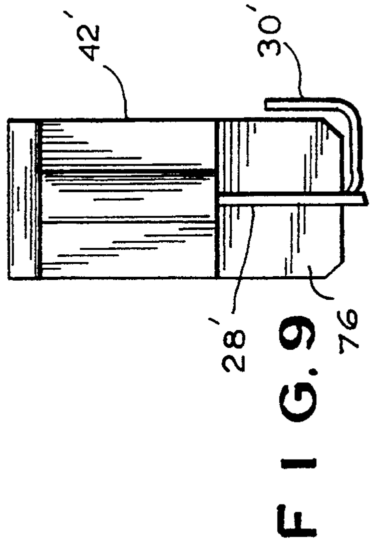
FIG. 9 is a side view of a second preferred embodiment of the present invention.

As seen in FIG. 1, the protection circuit includes six semiconductor diodes 10, 12, 14, 16, 18 and 20 which function as rectifiers to direct the flow of current in a single direction and hence may be referred to as "steering" diodes. Diodes 10–20 are connected to form a bridge rectifier. The cathodes of diodes 10, 14, and 18 are connected together by a conductor. The conductor in the present invention takes the physical form of a conductive plate 22, which acts as a positive direct current terminal. The anodes of diodes 12, 16 and 20 are connected together by a second conductor. In the present invention the second conductor takes the physical form of a second conductive plate 24, which acts as a negative direct current terminal.

The anode of diode 10 and the cathode of diode 12 are connected at a node 25 to form an alternating current terminal. Similarly, the anode of diode 14 and the cathode of diode 16 are connected at node 27, and the anode of diode 18 and the cathode of diode 20 are connected at node 29.

This arrangement results in a circuit in which, regardless of the polarity of any potential applied between nodes 25, 27, and 29, the polarity of plate 22 will remain positive with respect to plate 24. Node 25 is connected to a conductor 26 which is in turn connected to the tip conductor of the telecommunications line. Node 27 is connected to a conductor 28 which in turn is connected to the ring conductor of the telecommunications line. Node 29 is connected to conductor 30 which in turn is connected to ground.

The anode of thyristor 36 is connected to plate 22. The cathode is connected to plate 24.

The present invention relates to the structure of a circuit module which encompasses the electrical circuit of FIG. 1 and to a method for fabricating same using mass production techniques. Two preferred embodiments of the structure are illustrated, both of which can be obtained using the same basic fabrication techniques.

FIGS. 2, 3, 4, 5, 6, 7, 8 and 15 illustrate the structure of first preferred embodiment of the module. The internal structure is best understood by a consideration of FIGS. 5, 6, 7 and 15. The module consists of first and second copper plates 22, 24, the six steering diodes 10, 12, 14, 16, 18 and 20, a thyristor 36 and a lead frame 21. Sets of these devices are all placed in a solder fixture along an extended lead frame with solder preforms interposed at the appropriate locations. The solder fixture is then heated as a unit in a furnace.

The plates 22 and 24 are situated in spaced, generally parallel relation at the top and bottom of each location along the fixture. The cathodes of a first set of three steering diodes 10, 14, and 18 are provided with solder preforms and situated in spaced relation along one side of plate 22. The anodes of a second set of three steering diodes 12, 16 and 20 are provided with solder preforms and situated in the same spaced relation along one side of plate 24. Three pairs of aligned steering diodes are thus formed; 10 and 12, 14 and 16 and 18 and 20. The aligned steering diode pairs are arranged in a linear relation in this embodiment.

A lead frame section 21, fabricated of metal such as by stamping, forms the base of each module. The frame includes three spaced parallel leads 26, 28 and 30 for each module to be formed. The leads are connected at one end by a bridge 32. The frame section 21 for each module is situated between the diode sets. In particular, the anodes of diodes 10, 14 and 18 are provided with solder preforms and are situated adjacent to one of the sides of each of leads 26, 28 and 30 respectively. The cathodes of diodes 12, 16, and 20 are also provided with solder preforms and are situated adjacent to the other side of each of the leads 26, 28 and 30 respectively.

Adjacent to each diode pair 18 and 20, but out of alignment with steering diode pairs, is the surge suppression device in the form of an ungated thyristor 36. Copper slugs 38, 40 are provided on either side of device 36 and function as spacers. Slugs 38, 40 are provided with solder preforms on both sides to permit the slugs to be soldered between the surfaces of device 36 and plates 22 and 24, respectively.

While it is possible to fabricate one module at a time, the use of an extended lead frame permits sets of components for a plurality of modules to be processed simultaneously to form batches of modules. The sets of components are situated along the lead frame within an elongated soldering fixture.

Figure 15:
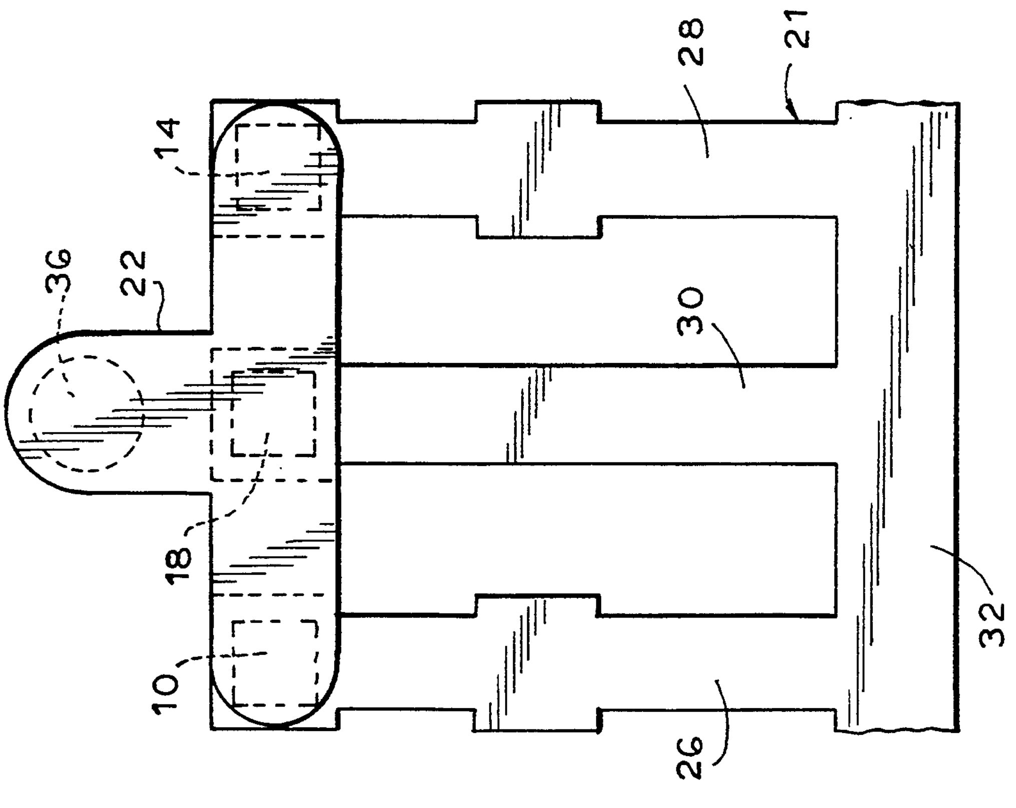
FIG. 15 is an enlarged top elevational view of the assembly of the first preferred embodiment prior to encapsulation.

A first conductive plate is placed in the bottom of the soldering fixture. Then four solder preforms with three steering diodes (or diode cells) and one thyristor cell are placed on top of the conductive plate in the appropriate locations. Then three solder preforms and the lead frame are placed on top of the first set of three diodes. On top of the lead frame, three solder preforms and the second set of three diodes is placed in the appropriate locations. Four solder preforms are placed on the three diodes plus the thyristor cell. The second conductive plate is then placed on top. The whole sub-assembly, which is held together by the soldering fixture is then placed in a furnace where the solder is melted, thus bonding all the components together to electrically and mechanically connect the devices, leads and conductive plates of each module. This is accomplished in a single operation. A plurality of partially formed modules as illustrated in FIG. 15 are obtained.

Because of the lead frame, after soldering, the partially formed modules can be removed from the solder fixture as a unit. The partially formed modules can then be encapsulated simultaneously by placing the unit in a molding fixture into which liquid epoxy is injected. After the epoxy is cured, the unit is taken out of the molding fixture and the modules are separated by removing the bridge. The bridge is removed in a single stamping operation. Instead of encasing in epoxy, a snap-on plastic case can be used. The cases can be affixed either before or after separation, as desired.

Figure 8:
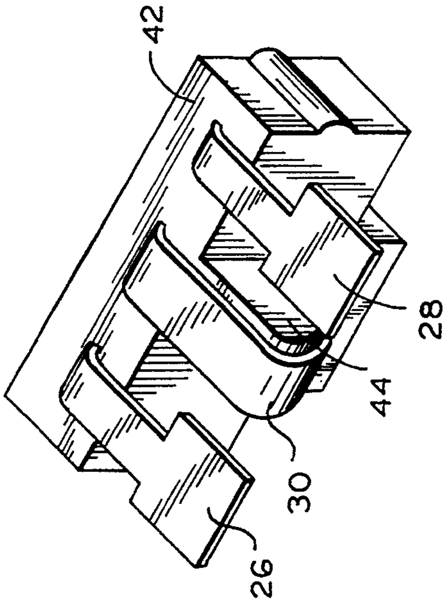
FIG. 8 is an isometric view of the first preferred embodiment.
Figure 10:
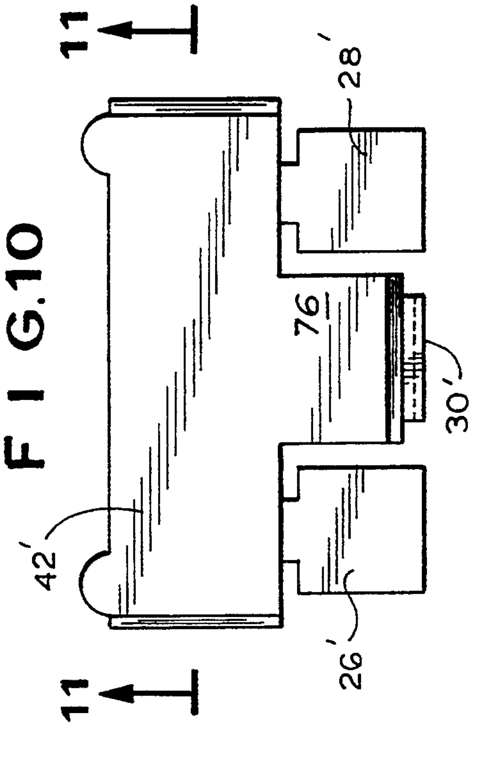
FIG. 10 is a top elevational view of the second preferred embodiment.

The leads 26, 28 and 30 extend out the top of the module. The leads may be trimmed and lead 30 may be bent, as illustrated in FIG. 8. The casing material is preferably molded to form a protrusion 44 to support the ground lead 30. Protrusion 44 extends outwardly from the front of the module.

The second preferred embodiment of the invention is illustrated in FIGS. 9, 10, 11, 12, 13, 14 and 16 and has a somewhat different structure but is formed using essentially the same process. Parts of the second preferred embodiment which correspond to those of the first preferred embodiment are referred to herein by primes. In the second preferred embodiment, the aligned steering diode pairs are not arranged in collinear relation, as they are in the first preferred embodiment. Moreover, the conductive plates 22′ and 24′ are spaced apart further than in the first preferred embodiment. Thus, a pair of conductive copper spacers are associated with each steering diode.

Figure 13:
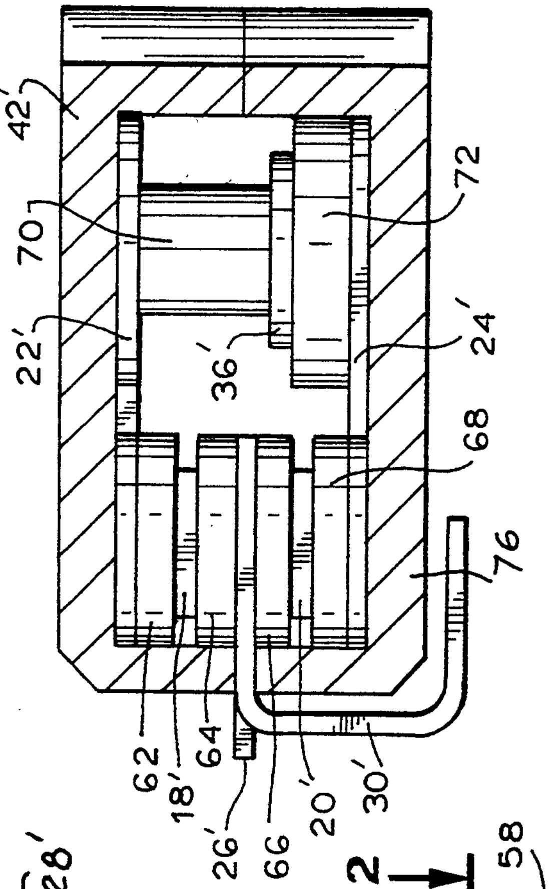
FIG. 13 is an enlarged side cross-sectional view of the second preferred embodiment taken along line 13—13 of FIG. 11.
Figure 12:
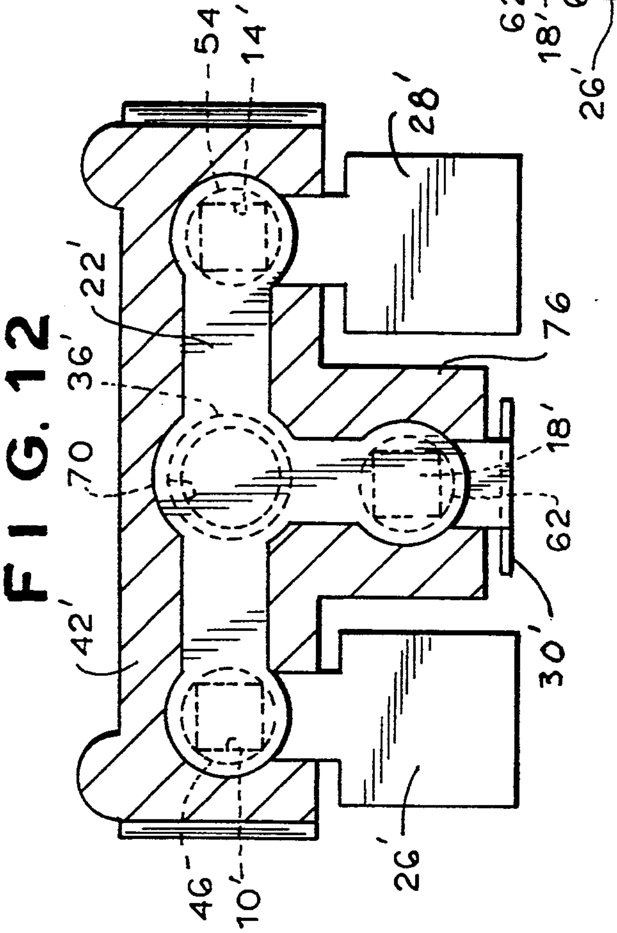
FIG. 12 is a top cross-sectional view of the second preferred embodiment taken along line 12—12 of FIG. 11.
Figure 11:
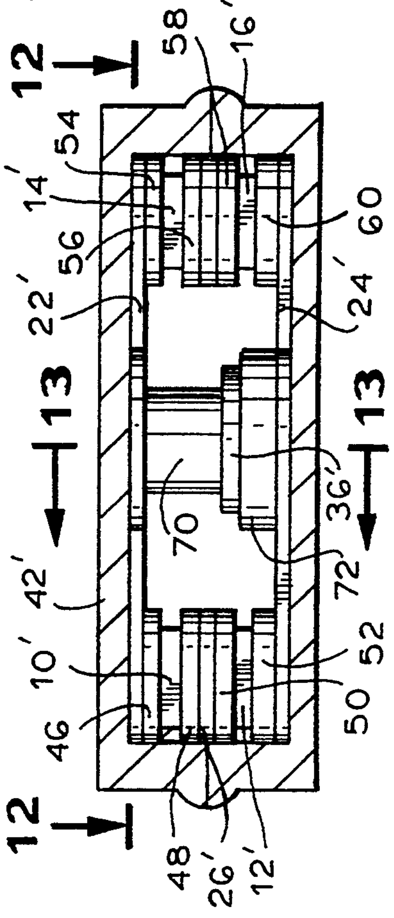
FIG. 11 is a cross-sectional view of the second preferred embodiment taken along line 11—11 of FIG. 10.

As shown in FIGS. 11 and 13, spacers 46 and 48 are associated with diode 10′. Spacers 50 and 52 are associated with diode 12′. Spacers 54 and 56 are associated with diode 14′. Spacers 58 and 60 are associated with diode 16′. Spacers 62 and 64 are associated with diode 18′. Spacers 66 and 68 are associated with diode 20′. Spacers 70 and 72 are associated with thyristor 36′.

Figure 16:
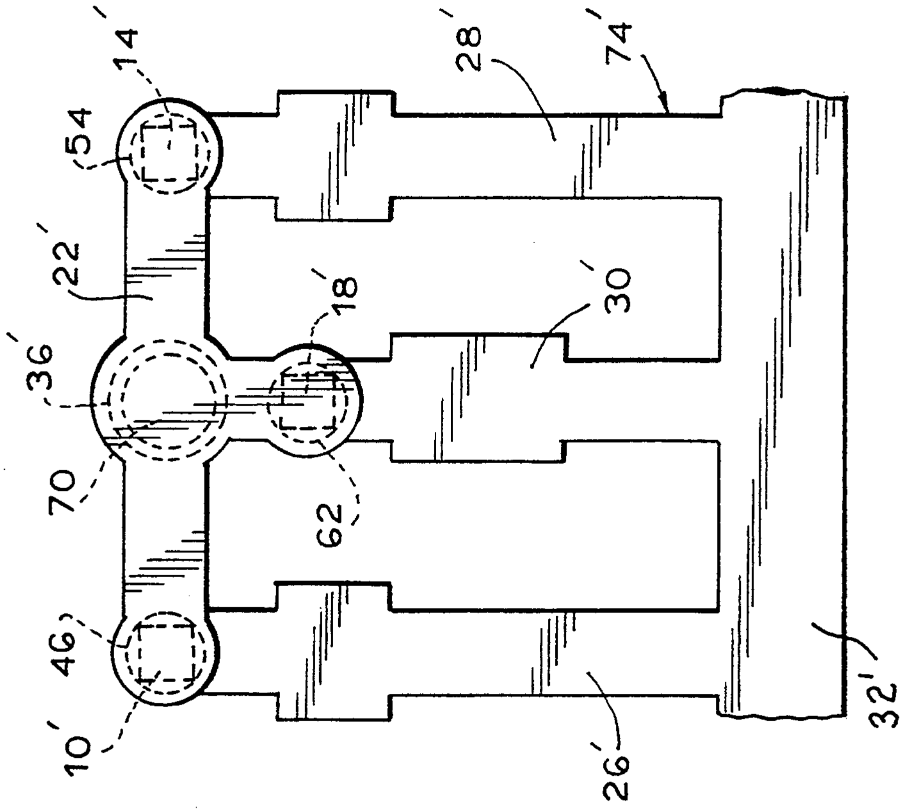
FIG. 16 is an enlarged top elevational view of the assembly of the second preferred embodiment prior to encapsulation.

Diodes 10′, 14′ and 18′ and the associated spacers are provided with solder preforms for connection to plate 22′. Diodes 12′, 16′ and 20′ and their associated spacers are provided with solder preforms, for connection to plate 24′. Thyristor diode 36′ and its spacers are provided with solder preforms as well. The lead frame sections 74 is situated between the steering diodes and spacers. Multiple sets of components are preferably soldered together along an extended lead frame in a single operation as described above, resulting a plurality of partially formed modules, one of which is shown in FIG. 16.

The partially formed modules are then simultaneously encapsulated or individually encased in a non-conductive snap-on plastic case 42′. The second embodiment of the module has a forwardly extending central portion 76 which aligns with lead 30′. Bridge element 32′ is removed and the leads are trimmed and bent as required.

The use of an extended lead frame permits mass production of the modules because it facilitates handling of the leads prior to soldering and of the partially formed modules during encapsulation. The lead frame is preferably stamped of a conductive material and includes three coplanar spaced leads for each module which are connected at one end by a bridge. The bridge functions to maintain the leads in the proper position within each module and permits handling of the modules as a unit. Thus, multiple modules may be soldered simultaneously in a single operation and encapsulated as a unit in a second operation.

As will now be appreciated, the use of an extended lead frame allows for fabrication of the modules using mass production techniques. Soldering insures excellent electrical and thermal conductance. This construction allows for the use of prepassivated diode chips which saves the cost of individual rectifier assembly. It permits the use of a mixture of rectifier chips and a preassembled ungated thyristor cell where the later can be surge tested prior to final assembly.

This fabrication method also permits the encapsulation medium to be adjusted to permit partial exposure of the plates to the air to improve heat transfer away from the module. Finally, the shape and orientation of the leads can be changed to permit greater flexibility in design.

While only two preferred embodiments of the present invention have been disclosed for purposes of illustration, it is obvious that many variations and modifications could be made thereto. It is intended to cover all of these variations and modifications which fall within the scope of the invention, as defined by the following claims:

We claim:

1. A circuit module for protecting telecommunications equipment from power surges by connecting one or both tip and ring conductors to a ground conductor, said module comprising first, second and third substantially parallel leads, first and second conductive plates, a first set of first, second and third diodes located spatially between said first and second conductive plates and operably connected between a first side of said first conductive plate and a first side of corresponding one of said first, second and third substantially parallel leads, a second set of fourth, fifth and sixth diodes located spatially between said first and second conductive plates and operably connected between a first side of said second conductive plate and a second side of a corresponding one of the first, second and third substantially parallel leads, said fourth, fifth and sixth diodes being in substantial alignment with said first, second and third diodes, respectively, an ungated thyristor operably connected between said first conductive plate and said second conductive plate, encasing means for encasing said first and second conductive plates, said first and second sets of diodes, said ungated thyristor, and said first, second and third substantially parallel leads so that portions of said first, second and third substantially parallel leads are exposed, said exposed lead portions being adapted to be operably connected to the tip, ring and ground conductors.

2. The module of claim 1 wherein said first, second, third, fourth, fifth and sixth diodes preferably comprise passivated rectifier chips.

3. The module of claim 1 wherein said first, second, third, fourth, fifth and sixth diodes comprise preassembled rectifier cells.

4. The module of claim 1 wherein said encasing means comprises means for encapsulating said first and second conductive plates, said first and second sets of diodes, said ungated thyristor, and said first, second and third substantially parallel leads.

5. The module of claim 4 wherein said means for encapsulating comprises an epoxy body.

6. The module of claim 1 wherein said encasing means comprises means for enclosing said first and second conductive plates, said first and second sets of diodes, said ungated thyristor, and said first, second and third substantially parallel leads.

7. The module of claim 6 wherein said means for enclosing comprises a snap-on plastic package.

8. The module of claim 1 wherein said first and second sets of diodes are soldered to said respective first and second conductive plates.

9. The module of claim 1 further comprising solder between each diode of said first set of first, second and third diodes and said first side of said first conductive plate, between each diode of said first set of first, second and third diodes and the first side of a corresponding one of said first, second and third substantially parallel leads, between each diode of said second set of fourth, fifth and sixth diodes and said first side of said second conductive plate, between each diode of said second set of fourth, fifth and sixth diodes and said second side of corresponding one of said first, second and third substantially parallel leads, and between said ungated thyristor and said first and second conductive plates.

10. The module of claim 1 further comprising electrically conductive spacers between each diode of said first set of first, second and third diodes and said first side of said first conductive plate, between each diode of said first set of first, second and third diodes and the first side of a corresponding one of said first, second and third substantially parallel leads, between each diode of said second set of fourth, fifth and sixth diodes and said first side of said second connective plate, between each diode of said second set of fourth, fifth and sixth diodes and said second side of a corresponding one of said first, second and third substantially parallel leads, and between said ungated thyristor and said first and second connective plates.

11. The module of claim 10 wherein said encasing means comprises a snap-on plastic package.

12. A method for assembling a plurality of circuit modules which protect telecommunication equipment from power surges, the method comprising the steps of:

for each module, retaining first, second and third conductive leads in a spaced, substantially parallel relationship with respect to one another;

for each module, operably connecting each diode of a first set of three steering diodes between a first conductive plate and a corresponding one of the first, second and third conductive leads;

for each module, operably connecting each diode of a second set of three steering diodes between a second conductive plate and a corresponding one of the first, second and third conductive leads so that each diode of said first set of three steering diodes is substantially aligned with a corresponding diode of said second set of three steering diodes and so that each diode of said first and second sets of three steering diodes is located spatially between said first and second conductive plates;

for each module, operably connecting an ungated thyristor between the first and second conductive plates; and, encasing the first and second conductive plates, the first, second, and third conductive leads, the first and second sets of three steering diodes, and the ungated thyristor of each module so that a portion of the first, second and third conductive leads remain exposed.

13. The method of claim 12 wherein the step of encasing comprises the step of encapsulating all of the circuit modules simultaneously.

14. The method of claim 12 wherein the step of encasing comprises the step of encapsulating in epoxy material.

15. The method of claim 12 wherein the step of retaining first, second and third leads comprises the step of retaining the first, second and third leads so that the first, second and third leads are attached in a lead frame, and wherein the method further comprises the step of detaching the leads from the lead frame.

16. The method of claim 12 wherein the step of encasing comprises the step of enclosing in snap-on plastic packages.

17. The method of claim 16 wherein the detaching step is performed prior to the encasing step.

18. The method of claim 12 further comprising the step of bending the exposed portion of one of the first, second, and third conductive leads.

19. The method of claim 12 wherein the first and second sets of steering diodes are soldered to the respective first and second conductive plates.

20. The method of claim 12 wherein in the ungated thyristor is soldered to the first and second conductive plates.

21. A circuit module for protecting equipment from power surges, the circuit module comprising:

a first conductive plate having first and second sides;

a second conductive plate having first and second sides;

first, second, and third conductive leads, wherein each of the first, second, and third conductive leads have first and second sides, and wherein the first, second, and third conductive leads are spatially located between the first and second conductive plates;

first rectifying means connected between the first side of the first conductive plate and the first side of the first conductive lead for rectifying current therebetween;

second rectifying means connected between the first side of the first conductive plate and the first side of the second conductive lead for rectifying current therebetween;

third rectifying means connected between the first side of the first conductive plate and the first side of the third conductive lead for rectifying current therebetween;

fourth rectifying means connected between the first side of the second conductive plate and the second side of the first conductive lead for rectifying current therebetween;

fifth rectifying means connected between the first side of the second conductive plate and the second side of the second conductive lead for rectifying current therebetween;

sixth rectifying means connected between the first side of the second conductive plate and the second side of the third conductive lead for rectifying current therebetween;

the first and fourth rectifying means being substantially aligned, the second and fifth rectifying means being substantially aligned, and the third and sixth rectifying means being substantially aligned;

voltage responsive conducting means connected between the first and second conductive plates for conducting in response to voltage across the first and second conductive plates; and, encasing means for encasing the first and second conductive plates, the first, second, third, fourth, fifth, and sixth rectifying means, the voltage responsive conducting means, and the first, second, and third conductive leads so that portions of the first, second, and third conductive leads are exposed for connection to an external circuit.

22. The circuit module of claim 21 wherein said encasing means comprises a snap-on plastic package.

23. The circuit module of claim 21 wherein the first, second, third, fourth, fifth, and sixth rectifying means comprise corresponding first, second, third, fourth, fifth, and sixth diodes.

24. The circuit module of claim 23 wherein the first, second, third, fourth, fifth, and sixth rectifying means comprise electrically conductive spacers associated with the first, second, third, fourth, fifth, and sixth diodes.

25. The circuit module of claim 23 wherein the first, second, third, fourth, fifth, and sixth rectifying means comprise solder associated with the first, second, third, fourth, fifth, and sixth diodes.

26. The circuit module of claim 23 wherein the voltage responsive conducting means comprises an ungated thyristor.

27. The circuit module of claim 26 wherein the first rectifying means comprises solder between the first diode and the first side of the first conductive plate and solder between the first diode and the first side of the first conductive lead, wherein the second rectifying means comprises solder between the second diode and the first side of the first conductive plate and solder between the second diode and the first side of the second conductive lead, wherein the third rectifying means comprises solder between the third diode and the first side of the first conductive plate and solder between the third diode and the first side of the third conductive lead, wherein the fourth rectifying means comprises solder between the fourth diode and the first side of the second conductive plate and solder between the fourth diode and the second side of the first conductive lead, wherein the fifth rectifying means comprises solder between the fifth diode and the first side of the second conductive plate and solder between the fifth diode and the second side of the second conductive lead, and wherein the sixth rectifying means comprises solder between the sixth diode and the first side of the second conductive plate and solder between the sixth diode and the second side of the third conductive lead.

28. The circuit module of claim 26 wherein the first rectifying means comprises an electrically conductive spacer between the first diode and the first side of the first conductive plate and an electrically conductive spacer between the first diode and the first side of the first conductive lead, wherein the second rectifying means comprises an electrically conductive spacer between the second diode and the first side of the first conductive plate and an electrically conductive spacer between the second diode and the first side of the second conductive lead, wherein the third rectifying means comprises an electrically conductive spacer between the third diode and the first side of the first conductive plate and an electrically conductive spacer between the third diode and the first side of the third conductive lead, wherein the fourth rectifying means comprises an electrically conductive spacer between the fourth diode and the first side of the second conductive plate and an electrically conductive spacer between the fourth diode and the second side of the first conductive lead, wherein the fifth rectifying means comprises an electrically conductive spacer between the fifth diode and the first side of the second conductive plate and an electrically conductive spacer between the fifth diode and the second side of the second conductive lead, and wherein the sixth rectifying means comprises an electrically conductive spacer between the sixth diode and the first side of the second conductive plate and an electrically conductive spacer between the sixth diode and the second side of the third conductive lead.

* * * * *